United States Patent
Jakubek

(10) Patent No.: US 10,641,212 B2
(45) Date of Patent: May 5, 2020

(54) ROCKET THRUSTER NOZZLE WITH CONNECTORS AND BRACE

(71) Applicant: Aerojet Rocketdyne, Inc., Sacramento, CA (US)

(72) Inventor: Matthew Todd Jakubek, Seattle, WA (US)

(73) Assignee: Aerojet Rocketdyne, Inc., Redmond, WA (US)

( * ) Notice: Subject to any disclaimer, the term of this patent is extended or adjusted under 35 U.S.C. 154(b) by 252 days.

(21) Appl. No.: 15/554,344

(22) PCT Filed: Mar. 11, 2016

(86) PCT No.: PCT/US2016/021957
§ 371 (c)(1),
(2) Date: Aug. 29, 2017

(87) PCT Pub. No.: WO2016/149075
PCT Pub. Date: Sep. 22, 2016

(65) Prior Publication Data
US 2018/0045141 A1    Feb. 15, 2018

Related U.S. Application Data

(60) Provisional application No. 62/133,406, filed on Mar. 15, 2015.

(51) Int. Cl.
*F02K 9/97* (2006.01)
*F02K 9/84* (2006.01)
*B64G 1/40* (2006.01)

(52) U.S. Cl.
CPC .................. *F02K 9/97* (2013.01); *F02K 9/84* (2013.01); *B64G 1/401* (2013.01); *B64G 1/403* (2013.01);
(Continued)

(58) Field of Classification Search
CPC ...................................... F02K 9/84; F02K 9/97
See application file for complete search history.

(56) References Cited

U.S. PATENT DOCUMENTS 3,142,153 A * 7/1964 Hensley .................... F02K 9/84
239/265.35
3,280,563 A * 10/1966 Bowersett ................. F02K 9/84
60/232

(Continued)

FOREIGN PATENT DOCUMENTS

WO    2012011853    1/2012

OTHER PUBLICATIONS

International Preliminary Report on Patentability for PCT/US2016/021957 dated Sep. 28, 2017.
(Continued)

*Primary Examiner* — Todd E Manahan
*Assistant Examiner* — Kyle Robert Thomas

(57) ABSTRACT

A thruster nozzle (24) includes a throat (28) and a nozzle end portion (30) that is integral with the throat. The nozzle end portion includes an outer wall (32) that has a plurality of circumferentially-disposed nozzle features or connectors (34). A brace (26) may be disposed at least partially around the thruster nozzle and mated with the nozzle features to restrict relative movement between the thruster nozzle and the brace. The brace may be attached with a vehicle body (22) of a vehicle.

14 Claims, 1 Drawing Sheet

(52) U.S. Cl.
  CPC ...... *F05D 2220/80* (2013.01); *F05D 2240/35* (2013.01)

(56) References Cited

U.S. PATENT DOCUMENTS

| | | | | |
|---|---|---|---|---|
| 3,354,651 | A | * | 11/1967 | Novotny ............... F02K 9/64 60/258 |
| 3,390,899 | A | * | 7/1968 | Herbert ............... F02K 9/84 285/45 |
| 4,318,271 | A | * | 3/1982 | Doukakis ............... F02K 9/84 60/232 |
| 4,434,614 | A | | 3/1984 | Gill et al. |
| 2014/0131481 | A1 | * | 5/2014 | Lelong ............... F02K 1/08 239/265.33 |

OTHER PUBLICATIONS

International Search Report and Written Opinion for International Application No. PCT/US2016/021957 completed Jul. 19, 2016.

* cited by examiner

ROCKET THRUSTER NOZZLE WITH CONNECTORS AND BRACE

CROSS-REFERENCE TO RELATED APPLICATIONS

The present disclosure claims priority to U.S. Provisional Patent Application No. 62/133,406, filed Mar. 15, 2015.

BACKGROUND

A vehicle such as a launch vehicle or a spacecraft may include one or more thrusters. Each such thruster may include a combustion or decomposition chamber and a nozzle that is attached to receive combustion or decomposition products from the combustion or decomposition chamber. The nozzle typically includes a relatively narrow throat at the combustion chamber and a downstream bell-shaped exit portion. The thruster is typically mounted to structure attached to the combustion or decomposition chamber opposite the nozzle in a cantilevered manner from the end such that the nozzle and combustion or decomposition chamber is free to vibrate and thermally expand/contract.

SUMMARY

A thruster nozzle according to an example of the present disclosure includes a throat, and a nozzle end portion that is integral with the throat. The nozzle end portion includes an outer wall that has a plurality of circumferentially-disposed nozzle features.

In a further embodiment of any of the foregoing embodiments, the nozzle features protrude from the outer wall.

In a further embodiment of any of the foregoing embodiments, the nozzle features are located at a common axial position along the outer wall.

In a further embodiment of any of the foregoing embodiments, the nozzle features are located at staggered axial positions along the outer wall.

In a further embodiment of any of the foregoing embodiments, one or more of the nozzle features are axially offset from an axial edge of the nozzle end portion.

In a further embodiment of any of the foregoing embodiments, the nozzle end portion flares from the throat.

In a further embodiment of any of the foregoing embodiments there is at least one of a catalyst bed, an injector, or a combustion chamber attached with the throat opposite of the nozzle end portion.

A vehicle according to an example of the present disclosure includes a vehicle body. A thruster nozzle includes a wall that has a plurality of circumferentially-disposed features, and a brace attached with the vehicle body and disposed at least partially around the thruster nozzle. The brace has brace features corresponding with the features of the thruster nozzle.

In a further embodiment of any of the foregoing embodiments, the brace features mate with the features of the thruster nozzle.

In a further embodiment of any of the foregoing embodiments, the brace features are connectors, and each of the connectors of the brace are mated in a respective tongue-and-groove joint with a corresponding one of the features of the thruster nozzle.

In a further embodiment of any of the foregoing embodiments, the tongue-and-groove joint includes a tongue that has a tip, a groove that has a bottom, and a thermal expansion gap between the tip and the bottom.

In a further embodiment of any of the foregoing embodiments, the brace features are brace connectors, and each of the brace connectors is mated in a respective compliant joint with one of the nozzle features. The compliant joint permits relative axial movement between the nozzle end portion and the brace and stopping relative off-axial movement between the nozzle end portion and the brace.

In a further embodiment of any of the foregoing embodiments, the nozzle features are located at a common axial position along the outer wall.

In a further embodiment of any of the foregoing embodiments, the nozzle features are located at staggered axial positions along the outer wall.

In a further embodiment of any of the foregoing embodiments, one or more of the nozzle features are axially offset from an axial edge of the nozzle end portion.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
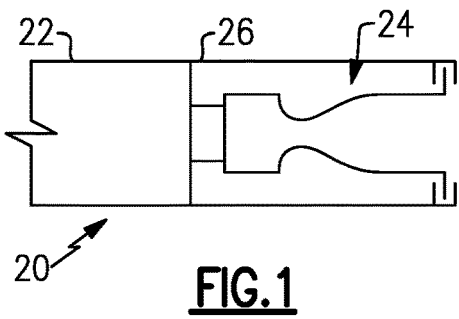
FIG. 1 illustrates an example vehicle that has a thruster nozzle and a brace that reinforces the nozzle.

FIG. 1 schematically illustrates an example vehicle 20. The vehicle 20 may be, but is not limited to, a launch vehicle or a spacecraft. The vehicle 20 includes a vehicle body 22, a thruster nozzle 24, and a brace 26 that is attached with the vehicle body 22 and disposed at least partially around the thruster nozzle 24. Although not limited, the brace 26 can be attached to the vehicle body 22 anywhere between its axial end as shown or at the nozzle exit via one or more rigid mountings, such as with fastening plates and/or fasteners. As will be described in further detail, the brace 26 compliantly reinforces the thruster nozzle 24 by stopping movement of the thruster nozzle 24 in at least one direction but permitting movement in at least one different direction.

Figure 2:
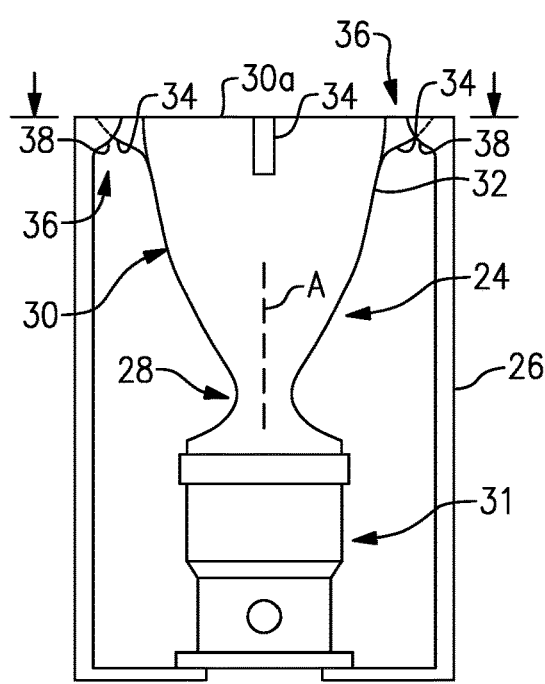
FIG. 2 illustrates an isolated view of a thruster nozzle and a brace.
Figure 3:
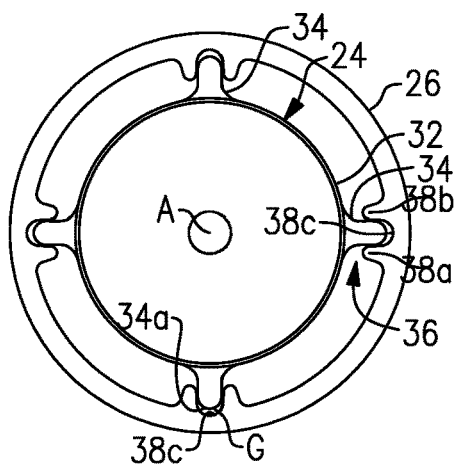
FIG. 3 illustrates an axial view of a thruster nozzle and a brace.

FIG. 2 illustrates an isolated view of the thruster nozzle 24 and brace 26, which are generally arranged about a central axis, A; and FIG. 3 shows an axial view of the thruster nozzle 24 and the brace 26. The thruster nozzle 24 includes a throat 28 and a nozzle end portion 30 that is integral with the throat 28. For example, the throat 28 and the nozzle end portion together are a monolithic body. The throat 28 includes the minimum flow area through the thruster nozzle 24, and the nozzle end portion 30 flares radially outwardly from the throat 28. The rocket thruster nozzle 24 may further include a catalyst bed, an injector, and/or a combustion chamber, and/or a solid motor, represented generally at 31, attached with the throat 28 opposite of the nozzle end portion 30.

The nozzle end portion 30 includes an outer wall 32 that has a plurality of circumferentially-disposed nozzle features or connectors 34. The brace 26 mates with the nozzle features 34 in respective compliant joints 36. In this regard, the brace 26 includes a plurality of brace connectors or features 38 that mate with the nozzle features 34 in the compliant joints 36.

In this example, the compliant joints 36 are tongue-and-groove joints. Here, the nozzle features 34 are tongues and the brace features 38 are grooves. The tongues may be, but are not limited to, ridges, fins, convex ribs, concave ribs, or other geometry. The tongues interfit with the grooves to selectively restrict relative movement between the nozzle end portion 30 and the brace 26. For example, as shown in FIG. 3, each brace feature 38 includes spaced apart walls 38a/38b that define a groove there between that has a groove bottom 38c. Each tongue extends into a corresponding one of the grooves. The interlocking between the tongues and grooves serves to stop off-axial movement between the thruster nozzle 24 and the brace 26, while permitting relative axial movement between the thruster nozzle 24 and the brace 26. For example, the tongues can slide along the axial direction in the grooves, but the walls 38a/38b stop off-axial movement in the circumferential direction and/or the radial direction (e.g., bending movement).

In this example, there is also a thermal expansion gap, G, between the tips 34a of the tongues and the bottoms 38c of the grooves. The thermal expansion gap permits the nozzle end portion 30 to thermally expand/contract in the radial direction without restriction by the brace 26, which may expand/contract at a different rate.

In the example illustrated, the nozzle end portion 30 includes four nozzle features 34 that are uniformally circumferentially-spaced. As can be appreciated given this disclosure, the nozzle end portion 30 could have fewer nozzle features 34 (e.g., at least two nozzle features 34) or additional nozzle features 34 (e.g., five, six, eight, or ten nozzle features 34).

Figure 4:
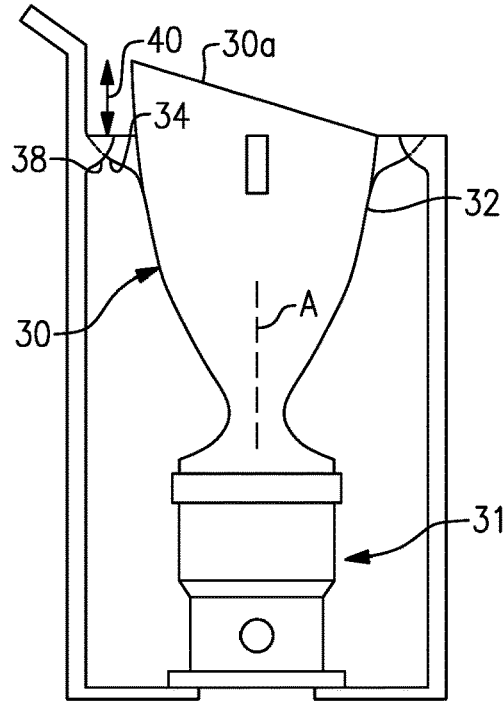
FIG. 4 illustrates another example of a thruster nozzle in which nozzle features are axially offset from an axial edge.

The nozzle features 34 are located at a common axial position along the outer wall 32. For example, the nozzle features 34 have common geometries, and a given common location (e.g., an axial face) of the common geometries is located at the common axial position. In the example shown, the nozzle features 34 are also located at an axial edge 30a of the nozzle end portion 30. However, the nozzle features 34 could alternatively be axially offset from the axial edge 30a of the nozzle end portion 30. FIG. 4 shows one such example. In this example, the nozzle end portion 30 includes a sloped form of the axial edge 30a, which may also be referred to as an integral scarf. At least one of the nozzle features 34 is axially offset from the axial edge 30a, as represented at 40.

Figure 5:
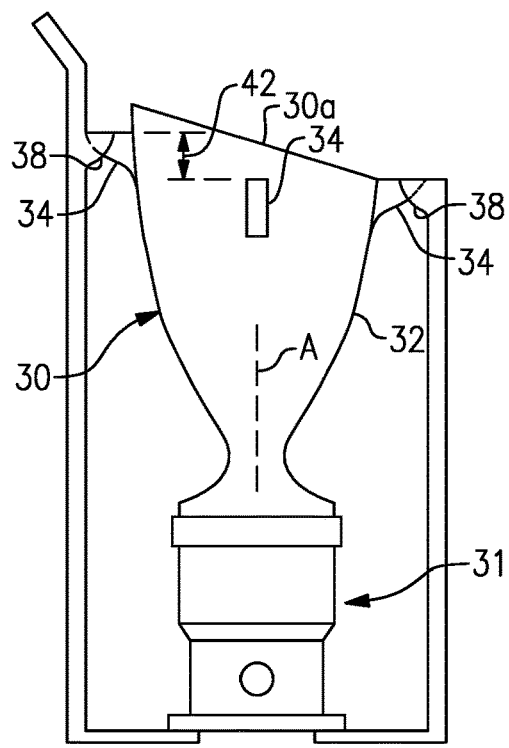
FIG. 5 illustrates another example of a thruster nozzle in which nozzle features are axially staggered.

As shown in a further example in FIG. 5, the nozzle features 34 are located at staggered axial positions along the outer wall 32, as represented at 42. That is, one or more of the nozzle features 34 are located closer to the axial edge 30a than one or more other nozzle features 34. Likewise, the brace features 38 will be located at a common axial position or at staggered axial positions, depending on the arrangement of the nozzle features 34.

The size and geometry of the nozzle features 34 and the brace features 38 can be selected based upon the expected loads exerted on the compliant joints 36 during operation of the vehicle 20. In this regard, both the width (circumferentially) and the protrusion length of the nozzle features 34 and the brace features 38 can be selected to accommodate greater or lesser expected loads. Additionally, although the nozzle features 34 are described herein as tongues and the brace features 38 are described herein as grooves, the nozzle features 34 could alternatively be provided as grooves and the brace features 38 could alternatively be provided as the tongues. Moreover, the compliant joints 36 are not limited to tongue-and-groove joints. In particular, other types of joints that permit axial movement but stop radial and circumferential movement could alternatively be used.

The brace 26 serves to structurally reinforce the thruster nozzle 24. Whereas cantilevered nozzles are typically free to twist and bend due to mechanical loads, thermal, shock, and vibration during vehicle and thruster operation, the brace 26 herein serves to stop off-axial movement of the thruster nozzle 24, particularly at or near the nozzle end portion 30. The thruster nozzle 24 and brace 26 thus provide enhanced durability that may also enhance the structural capability of the vehicle 20, including multiple-use possibility. Additionally, if the thruster nozzle 24 uses a catalyst bed, the reduction on movement of the thruster nozzle 24 may also reduce catalyst attrition.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A thruster nozzle comprising:
   a throat; and
   a nozzle end portion that is integral with the throat, the nozzle end portion including an outer wall having a plurality of circumferentially-disposed nozzle features, the circumferentially-disposed nozzle features being positioned at a first axial end of the nozzle end portion, the first axial end being opposite a second axial end of the nozzle end portion, and the second axial end of the nozzle portion being adjacent the throat; and
   wherein the nozzle features are configured to be received in corresponding brace features, and each combination of nozzle features and brace features forms a compliant joint,
   wherein the compliant joint permitting relative axial movement between the nozzle end portion and the brace and stopping relative off-axial movement between the nozzle end portion and the brace.

2. The thruster nozzle as recited in claim 1, wherein the nozzle features protrude from the outer wall.

3. The thruster nozzle as recited in claim 1, wherein the nozzle features are located at a common axial position along the outer wall.

4. The thruster nozzle as recited in claim 1, wherein the nozzle features are located at staggered axial positions along the outer wall.

5. The thruster nozzle as recited in claim 1, wherein one or more of the nozzle features are axially offset from an axial edge of the nozzle end portion.

6. The thruster nozzle as recited in claim 1, wherein the nozzle end portion flares from the throat.

7. The thruster nozzle as recited in claim 1, further comprising at least one of a catalyst bed, an injector, or a combustion chamber attached with the throat opposite of the nozzle end portion.

8. A vehicle comprising:
a vehicle body;
a thruster nozzle including:
a wall having a plurality of circumferentially-disposed features, each of the circumferentially-disposed features being disposed at first axial end of the thrust nozzle, the first axial end of the thrust nozzle being opposite a second axial end of the thruster nozzle and the second axial end of the thruster nozzle being adjacent a throat;
a brace attached with the vehicle body and disposed at least partially around the thruster nozzle, the brace having brace features corresponding with the features of the thruster nozzle; and
wherein the brace features are brace connectors, and each of the brace connectors is mated in a respective compliant joint with one of the nozzle features,
wherein the compliant joint permitting relative axial movement between a nozzle end portion and the brace and stopping relative off-axial movement between the nozzle end portion and the brace.

9. The vehicle as recited in claim 8, wherein the brace features mate with the features of the thruster nozzle.

10. The vehicle as recited in claim 8, wherein the brace features are connectors, and each of the connectors of the brace are mated in a respective tongue-and-groove joint with a corresponding one of the features of the thruster nozzle.

11. The vehicle as recited in claim 10, wherein the tongue-and-groove joint includes a tongue that has a tip, a groove that has a bottom, and a thermal expansion gap between the tip and the bottom.

12. The vehicle as recited in claim 8, wherein the nozzle features are located at a common axial position along the outer wall.

13. The vehicle as recited in claim 8, wherein the nozzle features are located at staggered axial positions along the outer wall.

14. The vehicle as recited in claim 8, wherein one or more of the nozzle features are axially offset from an axial edge of a nozzle end portion.

\* \* \* \* \*